United States Patent [19]
McCabe
[11] 4,295,486
[45] * Oct. 20, 1981

[54] LOW COST, DIFFUSER CONCEALABLE, VOLUME CONTROL, HEAT RESPONSIVE, RESETTABLE, BUTTERFLY DAMPER OPERATOR

[75] Inventor: Francis J. McCabe, Doylestown, Pa.

[73] Assignee: Prefco Products, Inc., Buckingham, Pa.

[ * ] Notice: The portion of the term of this patent subsequent to Apr. 28, 1998, has been disclaimed.

[21] Appl. No.: 77,583

[22] Filed: Sep. 21, 1979

Related U.S. Application Data

[63] Continuation-in-part of Ser. No. 900,620, Apr. 27, 1978, Pat. No. 4,263,930, which is a continuation-in-part of Ser. No. 896,299, Apr. 14, 1978, Pat. No. 4,195,384, Ser. No. 896,237, Apr. 14, 1978, Pat. No. 4,219,041, Ser. No. 792,525, May 2, 1977, Pat. No. 4,146,048, and Ser. No. 764,774, Feb. 2, 1977, Pat. No. 4,113,230, which is a continuation of Ser. No. 689,994, May 26, 1976, Pat. No. 4,081,173, said Ser. No. 896,299, is a continuation-in-part of Ser. No. 779,044, Mar. 18, 1977, Pat. No. 4,099,292, which is a continuation-in-part of Ser. No. 676,483, Apr. 13, 1976, Pat. No. 4,041,570, and Ser. No. 676,413, Apr. 13, 1976, Pat. No. 4,040,304.

[51] Int. Cl.[3] .......... F16K 17/38
[52] U.S. Cl. .......... 137/80; 49/2; 98/1; 137/601; 251/251
[58] Field of Search .......... 49/2; 160/1, 6; 16/48.5; 169/56; 137/75, 67, 77, 79, 80; 98/1, 86

[56] References Cited

U.S. PATENT DOCUMENTS

| | | | |
|---|---|---|---|
| 2,148,530 | 2/1939 | Burke | 126/287.5 X |
| 3,009,473 | 11/1961 | Hennen | 251/212 X |
| 3,337,991 | 8/1967 | Adams | 98/86 X |
| 3,467,163 | 9/1969 | Vassaux | 160/1 |
| 3,495,606 | 2/1970 | Phillips | 98/86 X |
| 3,720,153 | 3/1973 | Jardinier et al. | 98/86 |
| 3,725,972 | 4/1973 | McCabe | 16/48.5 |
| 3,734,114 | 5/1973 | Phillips | 160/1 |
| 3,796,248 | 3/1974 | McCabe | 160/1 |
| 3,814,165 | 6/1974 | McCabe | 160/207 |
| 3,866,657 | 2/1975 | McCabe | 160/181 |
| 3,889,314 | 6/1975 | McCabe | 16/48.5 |
| 3,899,156 | 8/1975 | McCabe | 98/86 X |
| 3,921,900 | 11/1975 | Cole | 137/601 |
| 4,080,978 | 3/1978 | McCabe | 137/601 X |
| 4,081,173 | 3/1978 | McCabe | 137/601 X |
| 4,146,048 | 3/1979 | McCabe | 137/512.1 X |

FOREIGN PATENT DOCUMENTS

| | | | |
|---|---|---|---|
| 2307228 | 11/1976 | France | 137/75 |

*Primary Examiner*—A. Michael Chambers
*Attorney, Agent, or Firm*—Benasutti Associates, Ltd.

[57] ABSTRACT

A novel operator is disclosed for use in combination with a butterfly fire and volume control damper, which operator may be concealed behind a standard concentric diffuser. Only a screwdriver aperture need be provided in the diffuser to facilitate the volume adjustment of the butterfly damper. In response to excessive heat in the vicinity of the damper, the blades of the damper will move to their fully closed position. Once activation conditions have passed, the damper may be reset by replacing the releasing device which separated in response to said heat.

30 Claims, 4 Drawing Figures

LOW COST, DIFFUSER CONCEALABLE, VOLUME CONTROL, HEAT RESPONSIVE, RESETTABLE, BUTTERFLY DAMPER OPERATOR

CROSS-REFERENCE TO RELATED APPLICATIONS

The present application is a continuation-in-part of my prior co-pending patent application Ser. No. 900,620, now U.S. Pat. No. 4,263,930, filed Apr. 27, 1978 entitled, "DIFFUSER CONCEALABLE, VOLUME CONTROL, HEAT-RESPONSIVE, SEMI-AUTOMATIC RESETTING, BUTTERFLY DAMPER AND OPERATOR" which in turn is a continuation-in-part of my prior co-pending patent application Ser. No. 792,525, filed May 2, 1977 entitled, "BUTTERFLY DAMPER" now U.S. Pat. No. 4,146,048 dated March 27, 1979, which applications are incorporated by references as if fully set forth herein.

Application Ser. No. 900,620, now U.S. Pat. No. 4,263,930, filed April 27, 1978 is also a continuation-in-part of my prior co-pending patent application entitled, "SELF-RESETTING, CABLE OPERATED TRANSLATING DRIVE LINK" Ser. No. 896,299, filed Apr. 14, 1978, now U.S. Pat. No. 4,195,384 dated Apr. 1, 1980 which in turn is a continuation-in-part of my prior co-pending patent application Ser. No. 779,044, filed Mar. 18, 1977 entitled "TELESCOPING HEAT RESPONSIVE RELEASING MEANS", now U.S. Pat. No. 4,099,292 dated July 11, 1978 which in turn is a continuation-in-part of my prior co-pending patent application entitled, "RESETTABLE HEAT ACTUABLE FIRE LINK", Ser. No. 676,483, filed April 13, 1976, now U.S. Pat. No. 4,041,570 dated Aug. 16, 1977 as well as a continuation-in-part of my prior co-pending patent application entitled, "CLUTCH MOTOR FOR USE IN RESETTABLE FIRE DAMPER", Ser. No. 676,413, filed Apr. 13, 1976, now U.S. Pat. No. 4,040,304 dated Aug. 9, 1977 which applications are also incorporated herein by reference as if fully set forth herein.

Application Ser. No. 900,620, filed Apr. 27, 1978, now U.S. Pat. No. 4,263,930, is also a continuation-in-part of my prior co-pending patent application Ser. No. 764,774, filed Feb. 2, 1977 entitled, "ROTATING BLADE FIRE DAMPER", now U.S. Pat. No. 4,113,230 dated Sept. 12, 1978 which in turn is a continuation of application Ser. No. 689,994, filed May 26, 1976 entitled, "ROTATING BLADE FIRE DAMPER", now U.S. Pat. No. 4,081,173, dated Mar. 28, 1978, which applications are also incorporated by reference as if fully set forth herein.

Application Ser. No. 900,620, filed Apr. 27, 1978, now U.S. Pat. No. 4,263,930, is also a continuation-in-part of my prior co-pending patent application entitled, "ELECTRO-THERMAL, FIRE PROTECTION LOCKING CLIP", Ser. No. 896,237, filed Apr. 14, 1978, now U.S. Pat. No. 4,219,041, which application is also specifically incorporated herein by reference.

BACKGROUND OF THE INVENTION

The present invention relates to butterfly fire dampers for use in air ducts, particularly those which are intended for use as fire, smoke and/or air control dampers and which are intended to automatically move between the open and closed positions in response to the presence of fire or, (when a remotely activatable releasing device is used) in response to the receipt of a fire or smoke activated signal, and/or to be moved to an intermediate position to allow preselected volumes of air therethrough.

Multiple, folding blade fire dampers having a plurality of blades disposed within a frame having an inwardly depending flange are known in the prior art, as for example, in my U.S. Pat. Nos. 3,814,165 and 3,866,657. In my U.S. Pat. No. 3,899,156, a single blade fire damper is described. In this regard, please refer to U.S. Pat. Nos. 3,009,473 (Hennan); 2,148,530; 3,337,991 ( Adams); 3,720,153 (Jardinier et al); French Pat. No. 2,307,228 (Barbarin) and my prior U.S. Pat. No. 3,725,972.

The present invention also relates to the field of operators, and more particularly to the field of damper operators which actuate butterfly dampers in response to heat or remote signals but which are resettable immediately after the passage of activation conditions so that they may again respond to fire conditions. The present invention also relates to operators which are adapted to set the position of a damper's blades to regulate the volume of air passing therethrough under normal conditions. Finally, the present invention relates to such operators which may be reset while providing only limited manual access to the vicinity of the damper blades.

Conventionally, fusible or meltable releasing devices have been employed, such as fusible links in cables which are held under tension in normal conditions and which are activated by the melting of the link and the link break cable to deploy the blades of a fire or smoke damper into their activated positions.

More recently, bimetallic links, such as those illustrated in my previously issued U.S. Pat. Nos. 3,889,314 entitled, "HEAT ACTUATED LINK" and 3,725,972 entitled "FIRE LINK AND METHOD OF ACTUATING SAME" have been described wherein a mounting element having a bimetallic strip attached thereto, which cooperates therewith, may engage a pawl having an aperture therein which is engaged by a bimetallic element in the normal position and which is released thereby as the tip of the bimetallic element separates from the striker portion of the mounting element thereof to release the pawl. These bimetallic links have conventionally been installed by attaching a cable to either the pawl, the mounting element, or both, in a manner similar to that use for the fusible or meltable links described above. These bimetallic links have exhibited certain advantages over the prior art fusible links in that following a return to temperatures, the link may be reset by reinserting the pawl into the remaining link assembly.

Unfortunately, prior art devices of the type described above have usually been installed in butterfly dampers in a manner which prevents those butterfly dampers from being used for volume control purposes. Additionally, such releasing devices have often been located in positions which require complete access to the butterfly damper, and particularly to the remote blade portions thereof where the link is most often located. In certain installations, such as smoke tunnels, ducks, plenums, etc., human access to reset or replace releasing devices is limited. Additionally, relatively skilled personnel must be employed in order to reset or replace the aforementioned releasing devices. In the case of bimetallic links, these people must at least understand the proper method of inserting the pawl so that it is properly gripped by the remaining portion of the link.

For one approach to this problem, please refer to my previously issued U.S. Pat. No. 3,796,248, dated Mar. 12, 1974 entitled, "REMOTELY RESETTABLE FIRE DAMPER".

SUMMARY OF THE INVENTION

The present invention provides a novel butterfly-type damper operator assembly which conveniently regulates the volume of air which passes therethrough under normal conditions, but under fire activated conditions, such as excessive heat, reliably causes the closure of the damper blades. The preferred embodiment of the present invention is intended primarily for mounting in the ceiling openings of heat and air conditioning ducts in private, public, and commercial buildings. Heretofore, it has generally been necessary to mount separate fire (or smoke) and volume control dampers in these ducts, each of which would perform its respective function. In order to improve the appearance of the duct opening into the room and in order to improve the dispersion pattern of air emanating therefrom, these fire and air control dampers have conventionally been mounted behind diffusers, as for example, conventional concentric square or round diffusers which establish air patterns within the room to be serviced.

Since most fire, smoke and air control dampers require nearly complete manual access thereto in order to reset or readjust those dampers, the resetting of activated fire or smoke dampers and/or the adjustment of volume control dampers has usually entailed at least the removal of the diffuser over the damper opening in order to establish such access. Where separate fire and air control dampers have been installed in a given system, manual access problems for the purpose of resetting an activated smoke or fire damper may be particularly acute. These inconveniences, particularly in large buildings, have tended to make frequent testing of fire protection apparatus cumbersome, and has additionally intended to inhibit seasonal adjustments of the volume-control apparatus, even though such adjustments may produce substantial energy savings and/or increased room comfort.

The preferred embodiment apparatus of the present invention is a combination volume-control fire damper which is ideally suited for mounting in an opening of a ceiling duct, which opening in covered by a diffuser. In order to operate the preferred embodiment damper of the present invention, only an aperture large enough to receive a screwdriver shaft must be provided in that diffuser in order to enable the adjustment of that damper. A screwdriver (or other implement such as a hex wrench) inserted into this aperture is guided into a complemental receptacle, such as a screwdriver slot, and is used to (under normal conditions) adjust the volume of air permitted to flow through the damper opening. The damper operator has a heat responsive means associated therewith, to release the blades to cause them to move to their fully closed position regardless of whatever volume setting those blades may have been in prior to the creation of those activation conditions. Once fire activated, manipulation of the volume control portion of the apparatus will not affect the position of the damper blades. However, once normal conditions are re-established, the volume control may be manipulated to conveniently reorient portions of the operator apparatus which anchor the releasing device. Once in this position, the manual resetting or replacement of the releasing device is easily facilitated due to the convenient orientation and position of the releasing device generally in front of the damper blades and immediately behind the diffuser. The preferred embodiment damper for use with the present invention comprises a butterfly damper having two blades which are pivotally mounted along a main mounting member which bisects the opening to be serviced. In the closed position, these damper blades cooperate with the frame to fully block the opening in which the damper is mounted. In the open position, the damper blades fold back against each other into positions which are slightly beyond perpendicular positions with respect to the plane of the damper frame or duct opening.

The preferred embodiment operator assembly of the present invention is mounted between one edge of the frame and a midpoint or other preselected point along the main mounting member of the damper. The operator comprises blade positioning means for establishing the relative positions of those blades with respect to each other and with respect to the damper frame. A heat responsive means is associated with the blade positioning means such that movement of the heat responsive means causes corresponding movement of the blade positioning means to thereby establish the relative positions of those blades. The heat responsive means comprises a fusible link or other releasing device for separating at least in response to preselected increases in the ambient temperature around said heat responsive means. The heat responsive means stands between the blade positioning means and a pawl member which is trackingly mounted on the pawl tracking means for moving and selectively positioning the pawl member along a path defined thereby. Means are also provided for limiting the travel of the pawl member and of the blade positioning means such that under normal conditions the pawl member may always be moved to a position relative to the blade positioning means which will enable convenient replacement or resetting of an activated releasing device. Under normal temperature conditions, movement of the pawl member along its path of travel causes corresponding movement of the heat responsive means and blade positioning means to establish volume control positioning of the damper blades.

In response to activation by heat or remote signals received by the heat responsive means, the positioning means and damper blades, which are each separately biased into their fire activated positions, are permitted to move into those activated positions. Since the movement of the blade positioning means is limited, upon return of normal conditions the pawl member may be recycled along its track to a position with respect to the blade positioning means which will facilitate the resetting or replacement of the heat responsive means, and to thereafter reset the damper blades into their preferred volume control positions.

Accordingly, a primary object of the present invention is the provision of a novel, combination volume control and fire or smoke damper.

Another object of the present invention is the provision of a heat reponsive fire or smoke damper which may be concealed behind a conventional diffuser and which may be remotely adjusted and conveniently manually reset.

Another aim of the present invention is the provision of a novel operator for volumetrically adjusting a butterfly damper.

Further objects of the present invention will become apparent from the following more detailed description.

DESCRIPTION OF THE PREFERRED EMBODIMENTS

Figure 2:
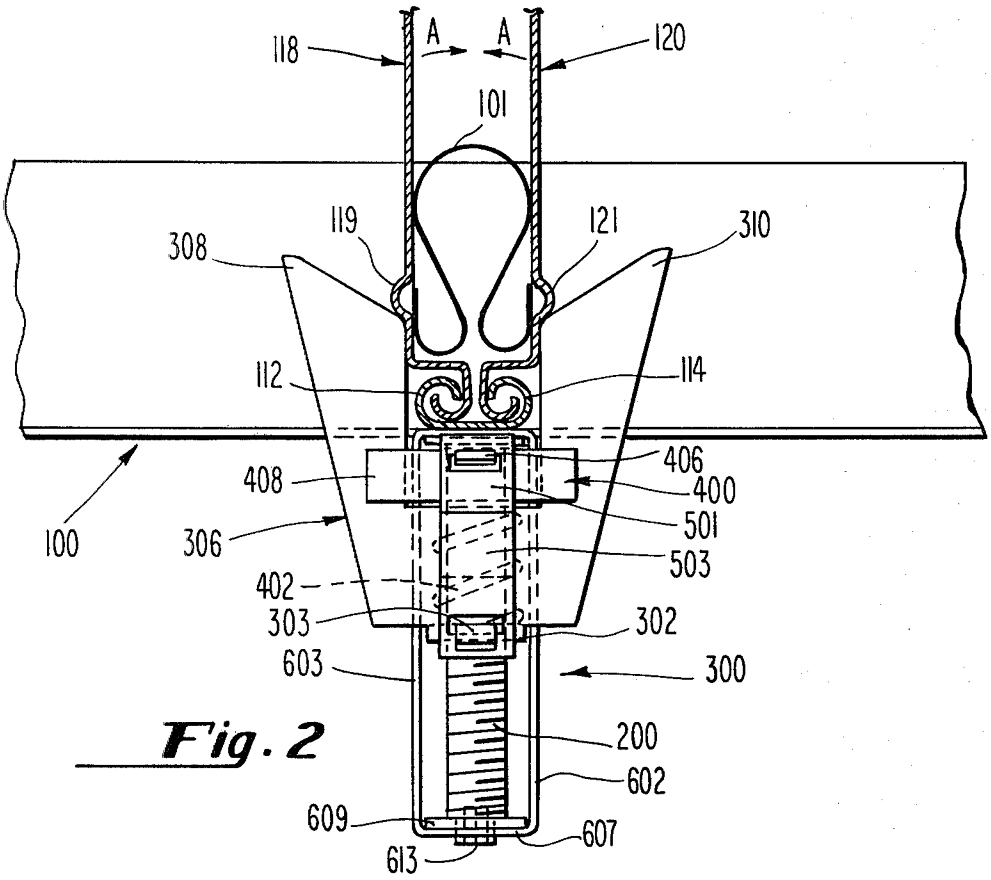
FIG. 2 is a fragmentary cross-section of the device illustrated in FIG. 1 taken as indicated by the lines and arrows 2—2 in FIG. 1.

Although specific forms of the invention have been selected for illustration in the drawings, and the following description is drawn in specific terms for the purpose of describing these forms of the invention, this description is not intended to limit the scope of the invention which is defined in the appended claims.

While the following description relates in particular to a combination fire and volume control damper, it is within the scope of the present invention to modify the hereinafter described embodiments to become a combination smoke and volume control apparatus, the difference between the two being the final desired activation position of the damper blades. In fire dampers, as described hereinafter, the opening in which the damper is mounted is to be fully closed in response to fire conditions. Smoke dampers, on the other hand, may be fully opened in response to fire activated conditions. Accordingly, in the hereinafter described combination fire and volume control damper, the blade positioning means and heat response associated therewith are described as being biased away from the damper blades so that upon activation, the blades are allowed to move to their fully closed position. By biasing the blade positioning means towards the damper blades, however, activation of the device would cause the blades to move to their fully opened position and the damper could thus act as a smoke damper. It is, accordingly, within the scope of the present invention to bias the hereinafter described parts as described to produce the desired activation positions of those parts and, of course, to provide biasing where necessary in order to compensate for different mounting orientations of the device.

Referring now to the figures, the butterfly damper designated generally 100 is similar to that described in my aforementioned patent application entitled, "BUTTERFLY DAMPER" and is seen to comprise main mounting member 106 which is defined into two hook shaped hinge elements 112 and 114 which are joined by a substantially planar intermediate portion 116 which forms a mounting surface for a portion of the operator assembly, as described hereinafter. The remainder of the butterfly damper portion of the illustrated apparatus comprises blades designated generally 118 and 120 comprising face portions 122 and 124; offsetting portions 130 and 132; extension portions 134 and 136; and hinge portions 138 and 140, respectively. The blade face portions 122 and 124 may be lined with insulating panels, if desired, for creating a substantial temperature barrier when the blades are in the closed position. Additionally, blades 118 and 120 are preferably provided with dimples 119 and 121, which cooperate with the blade positioning means as the blade positioning means is moved to the fully open position, as will be described more fully hereinafter.

Generally, the operator, designated generally 300 in the drawings, comprises a blade positioning means which is slidably mounted with respect to the frame and which slidingly engages portions of the damper blades for establishing the relative positions of those blades with respect to each other and with respect to the damper frame. The operator also comprises a pawl member trackingly mounted on a pawl tracking means for selectively positioning the pawl member at preselected positions therealong. A heat responsive means associated with the blade positioning means and spanning between the pawl member and the blade positioning means under normal conditions and for releasing the pawl member from the blade positioning means in response to preselected increases in the ambient temperature around said heat responsive means is provided. The relative location of the pawl member under normal conditions acts through the heat responsive means to establish the relative orientation of the blade positioning means, and thus the relative positions of the blades with respect to the damper frame.

Figure 3:
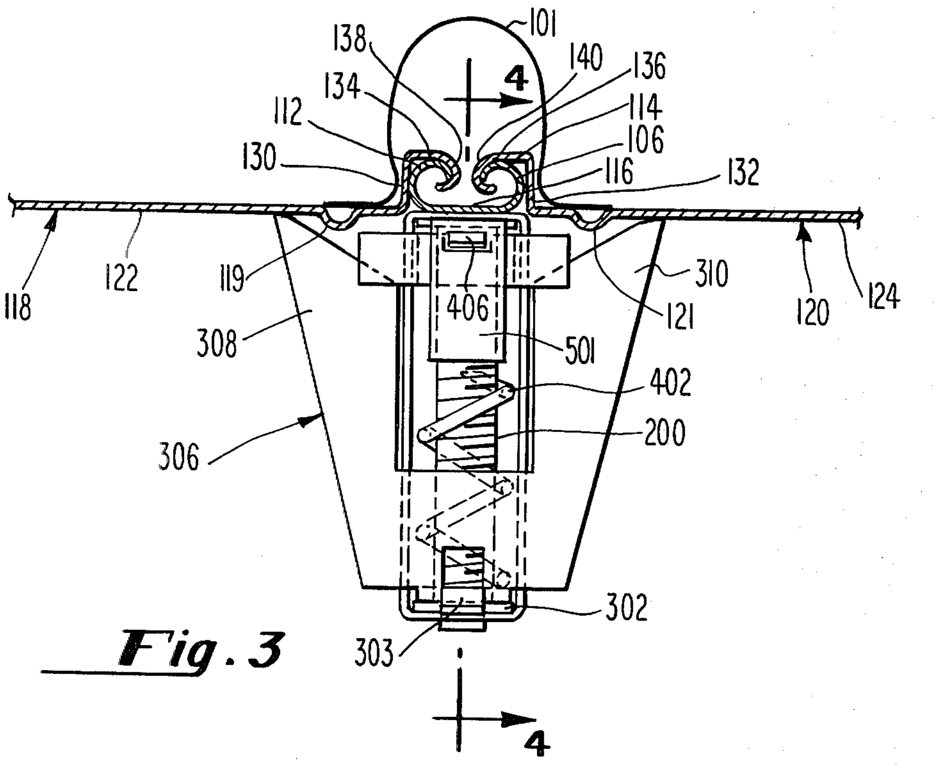
FIG. 3 is a fragmentary cross-section similar to the view shown in FIG. 2 of the preferred embodiment operator and a portion of its associated damper in their fire activated positions.

The blade positioning means comprises a blade positioning base bracket 302 which is journalled for sliding movement over the surface of threaded shaft 200. The blade positioning means further comprises a blade positioning member designated generally 306 comprising blade positioning wing portion 308 and 310, respectively which extend away from the blade positioning base bracket 302 and for a channel therebetween having substantially greater entrance distances therebetween near the tips thereof. Near their basal portions at which the blade positioning member intersects and is attached to blade positioning base bracket 302, opposing surfaces of wings 308 and 310 are substantially parallel to each other to define surfaces which will track along the pawl member of the operator, as described more fully hereinafter. The rounded corners which are formed between the parallel and flared portions of wings 308 and 310 come into engagement with blade dimples 119 and 121 as the operator is being moved towards its full open position. This engagement with the blade dimples causes those blades to be forced past their perpendicular open positions so that the remote ends of the blades (not shown) could be forced into contact with each other, that is the blades will be caused to move towards each other in accordance with arrows A in FIG. 2. The upper surfaces of blade positioning wings 308 and 310 are sloped, as seen particularly in FIGS. 2 and 3 so that upon movement of the blade positioning wings relatively towards and away from blades 118 and 120 the points of engagement between the wings and the blades of the damper vary towards the axis of the damper blade as the blades are moved towards their open position. Blade positioning wing portions 308 and 310 of the blade positioning member 306 define a channel within which the pawl member designated generally 400 is partially disposed, as described more fully hereinafter.

As seen in the drawings, and particularly by comparing the relative position of the blade positioning member 306 with respect to the remaining portion of the damper, the blade positioning means is mounted for selected axial movement towards and away from the damper blades along an axis which is perpendicular to and intersects the blades pivot axes. The movement of the blade positioning means relative to the blades is caused either by movement of the pawl designated generally 400 or by biasing means 402 which is preferably a spring disposed around threaded shaft 200 which is compressed (for the fire damper model) when the heat responsive means designated generally 500 is in place and which forces the blade positioning means away from the damper blades upon release by the heat responsive means in the direction of arrow B shown in FIG. 4.

The heat responsive means, designated generally 500, basically comprises a heat activatable releasing device, such as a fusible link, having a plurality of apertures defined in either end for receiving portions of the pawl 400 and blade positioning mounting plate 302. Since the pawl and blade positioning mounting blade are normally biased away from each other, the heat responsive means 500 will rigidly interconnect the blade positioning means with the pawl such that movement of the pawl will act through the heat responsive means to produce movement of the blade positioning means. While a fusible link is illustrated in the drawings, it is within the scope of the present invention to substitute other heat responsive means, such as the bimetallic links which are the subject of my above-referenced patents, and which are described more fully in the applications which have been incorporated by reference herein. In particular, see U.S. Pat. No. 3,889,314 entitled, "HEAT ACTUATABLE LINK", and U.S. Pat. No. 3,725,972 entitled, "FIRE LINK AND METHOD OF ACTUATING SAME". It is also within the scope of the present invention to substitute an alternate heat responsive means, such as disclosed in my aforementioned U.S. patent application Ser. No. 896,299, filed Apr. 14, 1978, now U.S. Pat. No. 4,219,041, entitled, "SELF-RESETTING, CABLE OPERATED TRANSLATING DRIVE LINK". At the present time a fusible link is preferred for the device illustrated due to its low cost, customer acceptance, and governing fire codes which in many jurisdictions do not yet require the installation of semi-automatic resetting fire dampers. In the future, however, it is anticipated that a fully resettable heat responsive means may become the preferred heat responsive means for use with the present apparatus.

Figure 1:
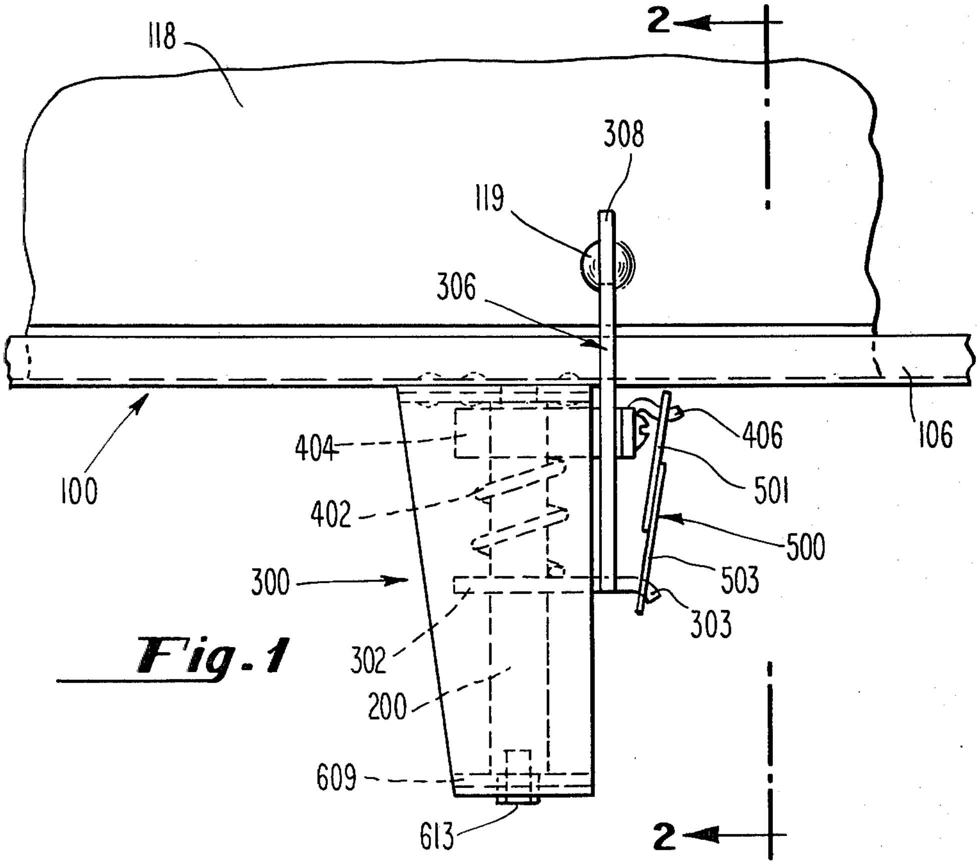
FIG. 1 is a side view of the preferred embodiment operator of the present invention shown mounted on a fragmentarily depicted butterfly damper, the preferred embodiment being illustrated in the position where the damper blades are near their full open position.

In response to a preselected increase in ambient temperature, the heat responsive means, which is seen in FIG. 1 to comprise upper and lower links 501 and 503 will separate, thus allowing the biasing spring 402 to force the blade positioning means associated therewith in the direction of arrow B, whereupon a blade spring such as blade spring 101 (or gravity, if preferred) causes the blades 118 and 120 to move to their fully closed positions.

The pawl member, designated generally 400, is trackingly mounted along a pawl member tracking means for selectively moving the pawl member between and maintaining said member in any of a variety of selected positions along a path defined thereby. The pawl member tracking means basically comprises a threaded shaft 200 and guide members 602 and 603 which extend generally perpendicularly away from the main mounting member 106 and are parallel and spaced apart from the threaded shaft 200. Together, the shaft 200 and guide member 602 and 603 defined an axis of reciprocal movement along which the pawl may travel. The pawl member tracking means is mounted to the main mounting member 106 of the damper by a pawl track mounting plate 604 which is riveted through a joining portion 605 of the pawl track mounting means, as shown in the drawing. The other end of the pawl member tracking means comprises a remote joining member 607 which cooperates with a threaded shaft bearing plate 609 to retain the remote end of the threaded shaft, and to permit that shaft to be rotated about its axis by a rotation means, such as a hex wrench socket 613. Thus, the pawl member tracking means may be seen to comprise, in the preferred embodiment, a single rectangular shaped member comprising sides which are pawl guide members 602 and 603 and ends 605 and 607 between which the threaded shaft 200 is rotatingly retained. As seen particularly in FIG. 4 bearing plate 609 additionally acts as a stop to limit the travel of the blade positioning means, by interfering with the travel of blade positioning mounting plate 302.

Referring now in particular to the construction of the pawl member 400, the pawl will be seen to comprise a substantially rectangular body member 404, the outer side surfaces of which slidingly engage the inner opposing surfaces of pawl member tracking means side plates 602 and 603. This rectangular pawl body member 404 threadingly engages the outer surface of threaded shaft 200, such that upon rotation of the shaft, such as through the use of a hex wrench shown in phantom in FIG. 4 in the direction of arrow C the pawl will move in the direction of arrow B indicated in that figure. The remote end of the pawl comprises a pawl hook 406 for receiving and retaining the upper member 501 of the heat responsive means 500. The intermediate portion of the pawl member 400 comprises a T-shaped tracking member 408 which is retained against the body member 404 of the pawl assembly by a set screw, and which defines two channels which complementally engage the channel of the blade positioning member 306 so that the blade positioning member 306 and the pawl member 400 will slide axially with respect to each other when the heat responsive means 500 separates to permit relative movement between the blade positioning means and the pawl member. Under normal conditions, however, the channels created by the T-member 408 cooperate with the blade positioning member 306 to aid in retaining that member in a perpendicular orientation with respect to the face of the damper blades.

Figure 4:
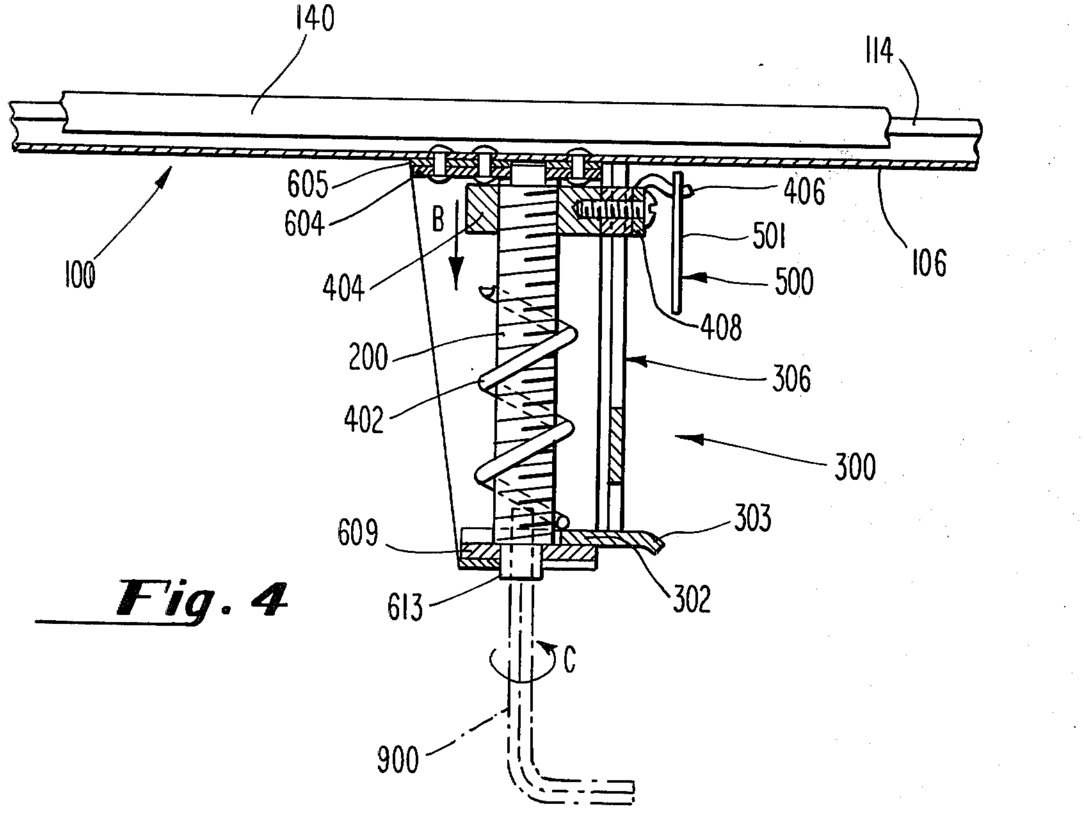
FIG. 4 is a fragmentary cross-section of the device illustrated in FIG. 3 taken as indicated by the lines and arrows 4—4 in FIG. 3, a hex wrench being shown in phantom in FIG. 4 to illustrate the process of reorienting the pawl member with respect to the blade positioning means.

Once the damper operator has been activated by fire conditions and the heat responsive means has separated, the operator of the present invention will assume the position shown in FIG. 4. In order to reset the device, a hex wrench such as hex wrench 900 is inserted into hex wrench socket 613, and threaded shaft 200 is rotated to move the pawl assembly in the direction of arrow B until the hook 406 of the pawl assembly is disposed at an appropriate distance from the hook portion 303 of the blade positioning mounting plate, whereupon a fresh releasing device may be substituted for the separated releasing device, and the hex wrench rotated in the opposite direction to return the pawl and its now interconnected blade positioning means to the desired volume control position, whereupon the blades will be caused to reopen to their desired volume control positions. From the above description, it will be seen that a simple, reliable volume/fire damper is provided which is responsive to fire activated conditions and which, after those conditions have passed, may easily be reset from a remote location, as for example, from the other side of a ceiling diffuser behind which the damper and operator are concealed. Further, remote activation may be provided depending upon the particular features of the heat responsive releasing device which is incorporated in combination with the operator of the present invention. Accordingly, the preferred embodiment device of the present invention is efficient and economical, while nonetheless providing superior smoke/fire protection without sacrificing volume control performance.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A damper operator for use with a damper having a frame and at least one blade, said blade being movable between open and closed positions with respect to said frame, said operator comprising:

(a) at least one pawl member associated with said frame;

(b) blade positioning means mounted for movement with respect to said frame for engaging said at least one blade of establishing, according to the relative position of said blade positioning means, the relative position of that blade with respect to said frame; and (c) heat responsive means connected during normal conditions between said blade positioning means in at least one of said relative positions and said pawl member, for disconnecting from between said pawl member and said blade positioning means at least in response to a preselected increase in ambient temperatures.

2. The invention of claim 1 wherein said pawl member is mounted for movement between any of a variety of preselected positions with respect to said frame.

3. The invention of claim 2 wherein said operator further comprises a pawl member tracking means fixedly mounted with respect to said frame for moving and selectively positioning said pawl member in any of said preselected positions.

4. The invention of claim 3 wherein said portions of said blade positioning means and said pawl tracking means comprise means for limiting the relative displacement of said blade positioning means in at least one direction to define at least an activated position of said blade positioning means.

5. The invention of claim 4 wherein said blade positioning means is biased to move into said activated position in response to said disconnecting of said pawl member from said blade positioning means.

6. The invention of claim 5 wherein said preselected variety of positions of said pawl member includes a reconnection position wherein said pawl member is reconnectable to said blade positioning means in said activated position by said heat responsive means under said normal conditions.

7. The invention of claim 6 wherein said blade is allowed to close as said blade positioning means moves into said activated position.

8. The invention of claim 5 wherein said blade is caused to open as said blade positioning means moves into said activated position.

9. The invention of claim 3 wherein said pawl member tracking means comprises at least one shaft journalled within a bore defined in said pawl member.

10. The invention of claim 9 wherein said shaft is threaded within said bore.

11. The invention of claim 10 wherein said tracking means comprises at least one tracking member for slidingly engaging a surface of said pawl member during movement of said pawl member.

12. The invention of claim 2 wherein, once established, said connection is maintained under normal conditions during the movement of said pawl into any of said preselected variety of positions.

13. The invention of claim 12 wherein said movement of said pawl member between said positions when said pawl member is connected to said positioning means acts through said blade positioning means to adjust to relative position of said blade with respect to said frame.

14. The invention of claim 13 wherein said pawl member and said blade positioning means slidingly engage each other at least during movement of said blade positioning means in response to activation by said heat responsive means.

15. The invention of claim 1 wherein said blade positioning means comprises at least one blade positioning wing for slidably engaging the face of said blade.

16. The invention of claim 1 wherein said heat responsive means comprises a fusible link.

17. A damper operator for use with a damper comprising a frame and at least one blade pivotally mounted on said frame for movement between at least open and closed positions with respect to said frame, said damper operator comprising:

(a) a blade positioning means mounted for movement with respect to said frame for engaging said at least one blade for moving said blade between said open and said closed position;

(b) a pawl member mounted for reciprocal movement with respect to said frame; and (c) heat responsive means for selectively connecting said blade positioning means to said pawl member in response to normal conditions and for disconnecting said pawl member from said blade positioning means at least in response to preselected increases in ambient temperature in the vicinity of heat responsive means.

18. The invention of claim 17 wherein said operator comprises means for defining the relative position of said blade positioning means, said relative position corresponding to the movement of said at least one blade in response thereto between said open and said closed position.

19. The invention of claim 18 wherein said operator further comprises pawl tracking means for selectively moving said pawl to and maintaining said pawl in any of a variety of preselected positions along said path.

20. The invention of claim 19 wherein sad pawl tracking means may always move said pawl to a position relative to said heat responsive means where, under normal conditions, said heat responsive means is reconnectable to said pawl.

21. The invention of claim 20 wherein said blade positioning means comprises at least one blade positioning wing for slidingly engaging the face of said blade.

22. The invention of claim 21 wherein said damper comprises a plurality of blades and wherein said blade positioning means comprises a plurality of wings, at least one for each blade, for slidingly engaging the faces of said blades.

23. The invention of claim 19 wherein said pawl tracking means further comprises at least one guide member mounted on said frame for slidingly engaging said pawl.

24. The invention of claim 23 wherein said pawl tracking means further comprises at least one threaded rod for engaging a complementally threaded bore in said pawl, whereupon rotation of said threaded shaft produces axial movement of said pawl therealong.

25. The invention of claim 24 wherein said pawl tracking means further comprises at least one pawl track stop plate extending at least between said guide member and said threaded shaft, said stop plate being disposed to interfere with and limit the movement of at least a portion of said blade positioning means.

26. The invention of claim 25 wherein said threaded shaft further comprises a rotation means for utilization to cause the rotation of said shaft to adjust the position of said at least one damper blade with respect to said frame by re-positioning said pawl member when engaged by said heat responsive means.

27. The invention of claim 17 wherein said heat responsive means further comprises a fusible link.

28. The invention of claim 17 wherein said damper further comprises two blades pivotally disposed for movement with respect to a main mounting member, and wherein said blade positioning means comprises a plurality of blade positioning wings, one for each blade, for movement on generally opposing sides of said main mounting member for moving said blades towards their open position.

29. The invention of claim 17 wherein said blade positioning means reciprocates along a path which is substantially perpendicular to the axis of rotation of said at least one blade.

30. The invention of claim 17 wherein said pawl member is reciprocally moveable along an axis which is substantially perpendicular to the plane of said blades in the closed position.

* * * * *